United States Patent [19]

Schmidt

[11] Patent Number: 4,655,441
[45] Date of Patent: Apr. 7, 1987

[54] DEVICE FOR THE TRANSVERSE AND/OR LONGITUDINAL WORKING OF WOOD WORKPIECES

[75] Inventor: Erich Schmidt, Mauerbach, Austria

[73] Assignee: MZW-Maschinenfabrik Zuckermann Gesellschaft m.b.H., Vienna, Austria

[21] Appl. No.: 800,795

[22] Filed: Nov. 22, 1985

[30] Foreign Application Priority Data

Jan. 30, 1985 [DE] Fed. Rep. of Germany ... 8502434[U]

[51] Int. Cl.$^4$ .......................................... A47G 27/04
[52] U.S. Cl. ........................................ 269/61; 74/409; 74/425
[58] Field of Search ............. 269/61, 71, 73; 408/3, 408/35; 409/80, 168, 192, 198, 211, 213, 217, 224; 144/144 R, 137, 145 R, 3 R, 1 R, 1 A, 356, 134 R; 74/409, 425; 188/83, 84

[56] References Cited

U.S. PATENT DOCUMENTS

| | | | |
|---|---|---|---|
| 1,907,518 | 5/1933 | Dierkens et al. | 188/83 |
| 2,318,791 | 5/1943 | Mueller | 269/73 |
| 2,693,717 | 11/1954 | Schick | 188/83 |
| 3,762,234 | 10/1973 | Hoglund | 74/425 |
| 4,542,814 | 9/1985 | Ledeen et al. | 74/425 |
| 4,558,861 | 12/1985 | Gall | 188/83 |

Primary Examiner—Robert C. Watson
Attorney, Agent, or Firm—Finnegan, Henderson, Farabow, Garrett & Dunner

[57] ABSTRACT

The invention relates to a device for the transverse and/or longitudinal machining of wood workpieces having at least one clamping table which is rotatable or tiltable about at least one pivot axis. The clamping table is connected to a drive gear of a servo drive positioned in the pivot axis. So that the servo drive of the device can also operate free from play during a machining operation, an output gear wheel having front and rear tooth flanks and connected to a servo motor via a drive gear and a sprocket wheel are secured on an output shaft. The sprocket wheel is in engagement with a tension chain which exerts a torque on the output shaft in a predetermined rotational direction, one free end of the tension chain being connected to a controllable fluid cylinder so that in any rotational direction of the servo motor or of the output shaft, either front or rear tooth flanks of the output gear wheel are constantly in contact with corresponding flanks of the drive gear.

7 Claims, 16 Drawing Figures

DEVICE FOR THE TRANSVERSE AND/OR LONGITUDINAL WORKING OF WOOD WORKPIECES

BACKGROUND OF THE INVENTION

The invention relates to an apparatus for the transverse and/or longitudinal machining of wood workpieces, with at least one clamping table which is rotatable or tiltable about at least one pivot axis and which is connected to an output shaft of a servo drive lying in the pivot axis.

An apparatus of this type is already known from U.S. Pat. No. 4,512,380. The apparatus has a workpiece carriage for receiving one or more workpieces, which is moveable in the direction of the X axis of a three dimensional X-Y-Z co-ordinate system along at least one transverse machining tool. The transverse machining tools themselves are adjustable in the Y and Z axes for working. Arranged on the workpiece carriage is a clamping table which is tiltable about an axis arranged parallel to the X axis and pivotable or rotatable about an axis arranged vertical to the X axis.

With the aid of this woodworking machine, small batches can be produced very cost-effectively as the workpieces can be worked with a single clamping. For execution of the pivot or tilt movement of the clamping table, in the known device servo drives are provided which comprise two pneumatic cylinders which are connected by means of a control chain, the control chain being in engagement with a sprocket wheel fixed on an output shaft. The output shaft lies in this case in the pivot axis of the clamping table. For rotation or tilting the control chain is moved by appropriate extension of one and retraction of the other pneumatic cylinder, causing the output shaft to turn. This device has proven successful in practice.

OBJECTS AND SUMMARY OF THE INVENTION

It is an object of the present invention to provide a servo drive which is improved over this prior-art device by being free from play as far as possible and which also ensures high production accuracy when the workpiece is rotated and tilted during working. This freedom from play is particularly required when the rotational direction or tilting direction changes during the working operation.

The invention is therefore directed to improving an apparatus of the type disclosed in U.S. Pat. No. 4,512,380 in such a way that the servo drive of the device operates free from play even when the rotational or tilting direction is changed during a working operation.

This problem is solved according to the invention by providing a device having an output gear wheel with front and rear tooth flanks and connected via a drive gear to a servo motor. A sprocket wheel is rigidly mounted on an output shaft with the sprocket wheel being in engagement with a tension chain exerting a torque on the output shaft in a predetermined rotational direction. One free end of the tension chain is connected to a controllable fluid cylinder so that in any rotational direction of the servo motor and of the output shaft, either front or rear tooth flanks of the output gear wheel are constantly in contact with corresponding flanks or walls of the drive gear wheel.

This solution is simple and inexpensive and, furthermore, results in easy operation of the device. With the invention it is possible, for example via a high-reduction gear, to maintain the angular position of the workpiece very accurately and, on the other hand, to ensure freedom from play of the servo drive. The use of a controllable fluid cylinder makes it possible to keep the pre-tension of the output shaft constant in every angular position so that inaccuracies due to different tensions from the drive shaft in different working positions are avoided. The reference to front or rear tooth flanks of the output gear wheel is simply to indicate that the pre-tensioning of the tension chain is selected in such a way that the same tooth flanks always have contact even when the rotational direction changes. Thus, there is no change in the tooth flank contact upon a reversal of rotational direction. This has the advantage that even when using older servo drives, with which there is possible already a relatively large play between drive wheel and output wheel, this no longer has a notable affect on the output shaft, and thus on the rotation or tilting of the clamping table.

Although it would also be possible to attach the other free end of the tension chain likewise to a fluid cylinder which then conforms to the movement, it is advantageous in the sense of the invention if the free end of the tension chain is fixed to the sprocket wheel. This still allows a tilting movement of almost 360° to be achieved. In this manner, the fixing of the other end of the tension chain to the sprocket wheel is an inexpensive solution. If a rotation of more than 360° is desired, the first-mentioned solution with two fluid cylinders would be advantageous.

A simple design of the servo drive is obtained if the drive wheel is designed as a worm and the output gear wheel as a worm wheel. The resultant worm gear of itself makes possible high reductions, so that even relatively small servo motors can be used and thus the power requirement of the servo drive is lessened.

It is preferred to design the fluid cylinder as a hydraulic cylinder as there is already provision for hydraulic equipment with respect to the device.

According to a further embodiment of the invention, the controls of the fluid cylinder have sensors for an even tensioning of the tension chain. These sensors can be designed as wire strain gauges or other known sensors and are used for set/actual value comparison of the chain tension.

BRIEF DESCRIPTION OF DRAWINGS

An exemplary embodiment of the invention shall now be described with reference to the accompanying drawings, in which.

DESCRIPTION OF THE PREFERRED EMBODIMENT

Figure 1:
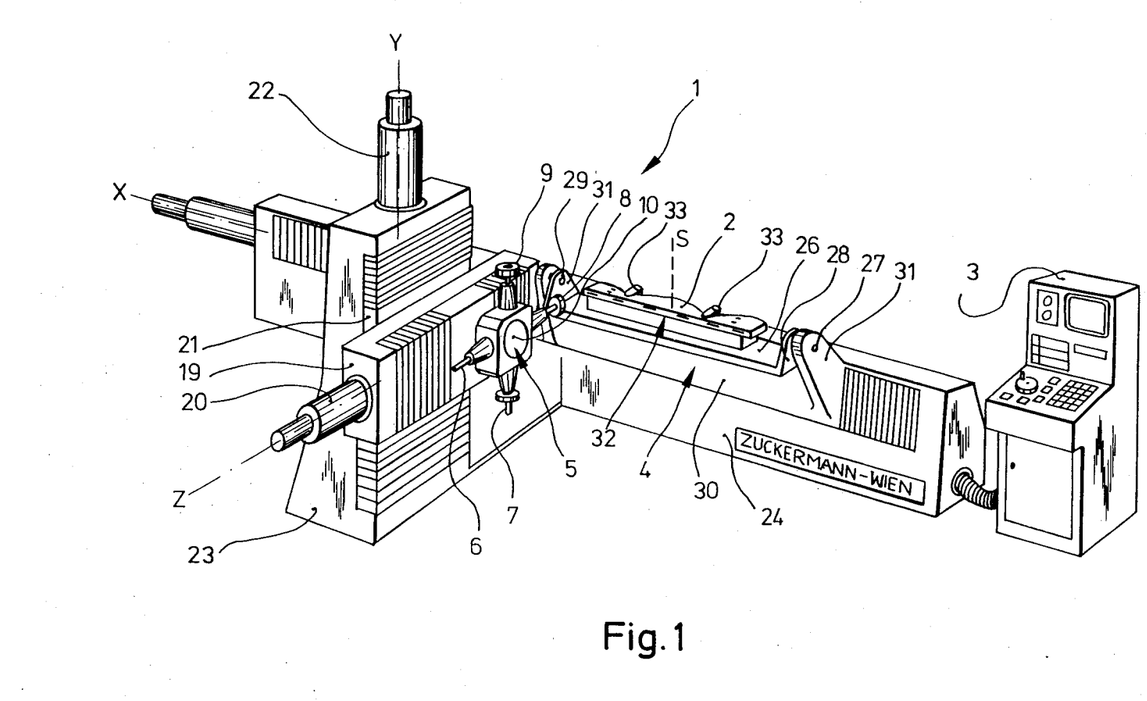
FIG. 1 shows a diagrammatic, perspective view of an apparatus according to the invention.

FIG. 1 of the drawings is a representation of the apparatus 1 for the transverse machining of wooden workpieces 2. Prior to the description of details of apparatus 1, a summary of the main components of the apparatus will be provided with reference to FIG. 1.

Apparatus 1 is primarily for the transverse machining of workpieces made of solid wood. However, it is also suitable for longitudinal machining of workpieces of other materials which machine similar to wood.

In the present embodiment, the device 1 is fitted with a CNC path control, which makes possible fully automatic machining of workpieces 2 in a single clamping position. A control device 3 is arranged as a separate unit at one side of the effective working area of the apparatus and is connected to the apparatus via conventional control circuitry.

The control device of the apparatus basically comprises an electronic computer which provides control parameters in the form of electrical signals to motor control units. The motor control units themselves generate an electrical voltage proportional to an input signal, the magnitude of which determines, for example, the speed of the DC motors associated with axle drives of the apparatus. Each such drive motor has a tachometer for the set/actual value comparison of the rotational speed and an incremental shaft encoder for recording the actual position.

Figure 10:
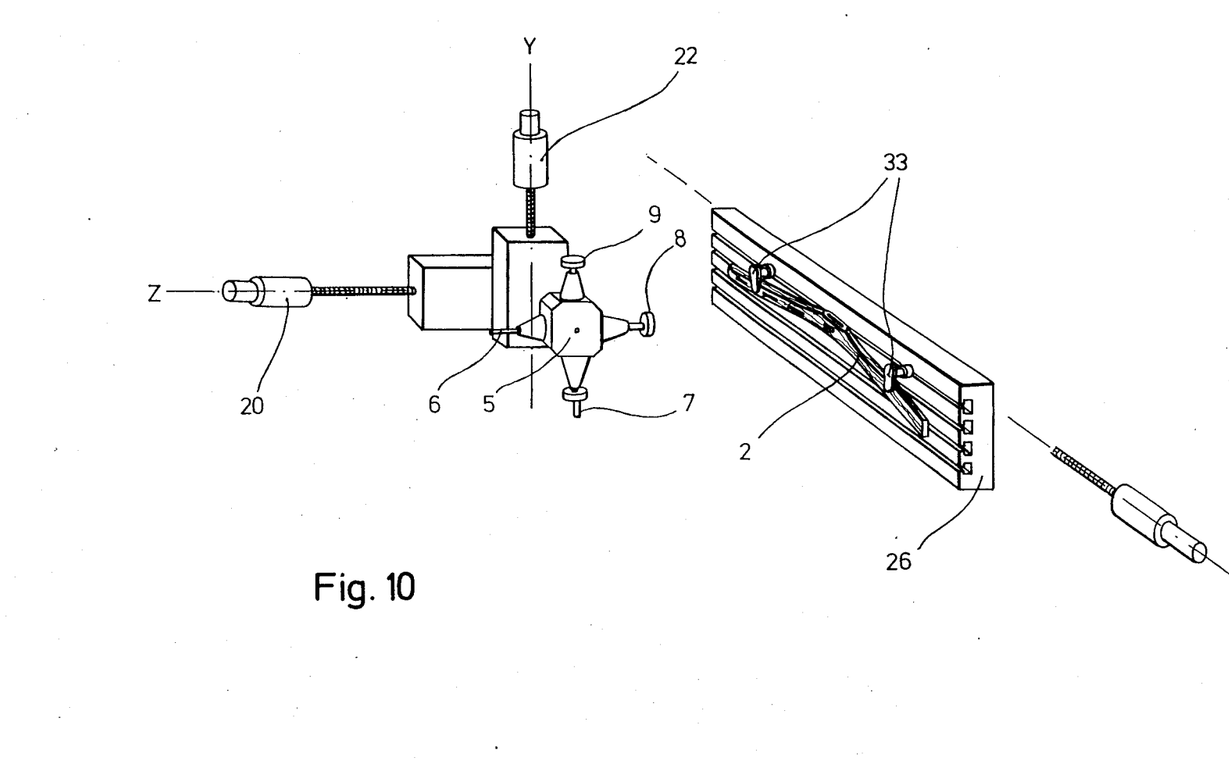
FIG. 10 shows a diagrammatic, perspective view of the swivel table, indicating the threedimensional X-Y-Z axis co-ordinate system.

The path control device 3 operates using a three dimensional X-Y-Z axis co-ordinate system which is designated in FIGS. 1 and 10 by X, Y, and Z. In this system, the X axis runs in the longitudinal direction of a workpiece carriage 4, to be described in greater detail later, and is in horizontal alignment with respect to the apparatus shown in the drawings. The X axis defines the direction of movement of the workpiece carriage and the mounting of the workpiece.

The Y-Z axes are associated with the tool assembly of the apparatus. The Y axis extends vertically and relates to the vertical positioning of the tool or tools. Like the X axis, the Z axis is horizontal and relates to the horizontal adjustment of the tool toward and away from the workpiece for machining. The Z axis is perpendicular to the Y and X axes.

In the embodiment shown, a revolving tool carrier head 5 is equipped with four different tools 6, 7, 8 and 9.

The tools are arranged radially at mutual angles of 90° on the circumferential surface of the head 5 which revolves about a horizontal axis 10 parallel to the X axis. The tool 6 is a twist drill. The tool 7 is a universal cutter, as illustrated for example in FIGS. 6 and 7. The cutter has a cylindrical section 11, a drive connection spindle in and a large-diameter cylindrical milling head section 13 between sections 11 and 12. Both cutting sections 11 and 13 have faces 14 and 15, respectively, formed with cutting edges which may be used also for machining, as shown in FIGS. 6 and 7.

Figure 6:
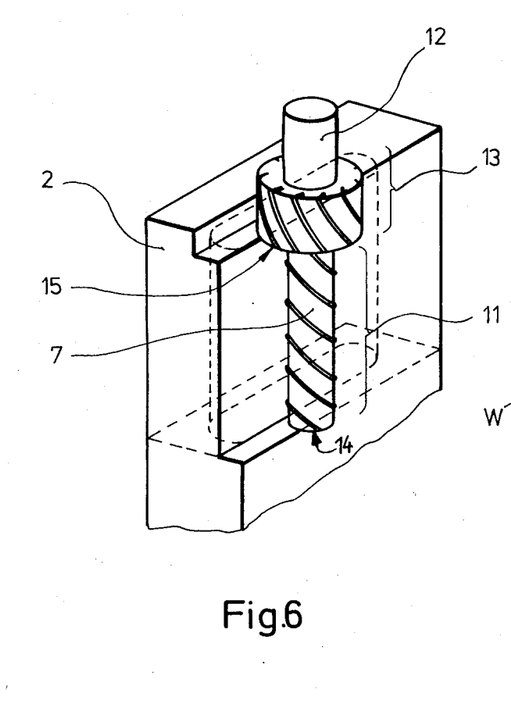
FIGS. 6–7 show a perspective view of a universal cutter for a variety of uses.

FIG. 6 shows by the area outlined by dashed lines the areas of workpiece 2 which are machined. It can clearly be seen that not only the circumferential surfaces of the cutters 11 and 13 machine the workpiece, but also the ends 14 and 15. The transverse machining operation shown produces an L-shaped recess in the workpiece 2.

Figures 7, 8:
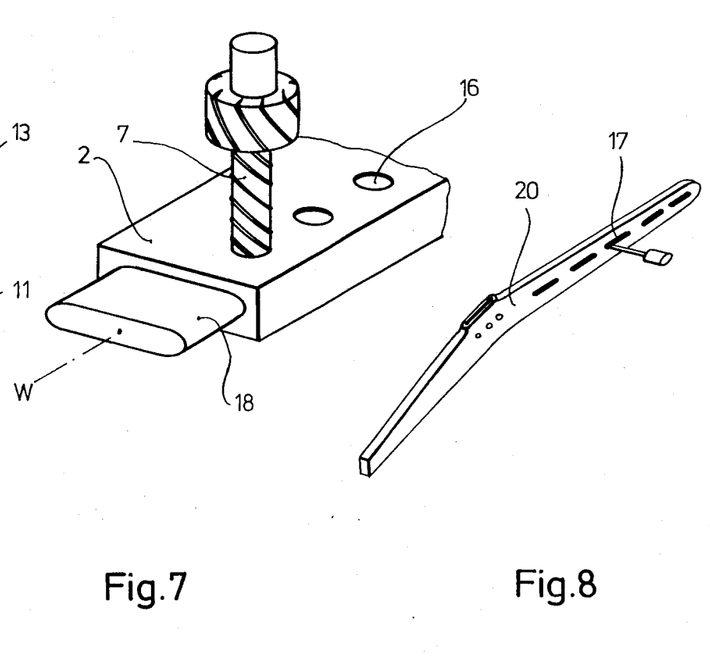
FIG. 8 shows a perspective view of a workpiece machined by the universal tool shown in FIGS. 6 and 7.

FIG. 7 shows how the cutter 7 is used only for drilling holes 16. The cutter is lowered for this purpose perpendicular to the surface to be worked and advanced until a hole of the required depth is obtained.

FIG. 8 illustrates in diagrammatic form a transverse machining operation preformed on the workpiece 2. In this application the cutter 7 is moved transversely to form a slot 17 in the workpiece 2. In producing the slot, interpolation is used by the path control to guide the cutter. The slot can have a greater width than the width of the section 11 of the cutter 7. To produce this effect, the cutter is moved along in parallel paths until the desired slot width is produced.

Tenon 18 of the workpiece 2 shown in FIG. 7 was likewise produced by the universal cutter 7, although at a different orientation relative to the workpiece 2. With this orientation, the rotary axis of tool 7 extends parallel to the workpiece axis W, and the cutter is advanced along a path similar to the one used for forming slots 17 to machine material from the periphery of tenon 17.

Figure 16:
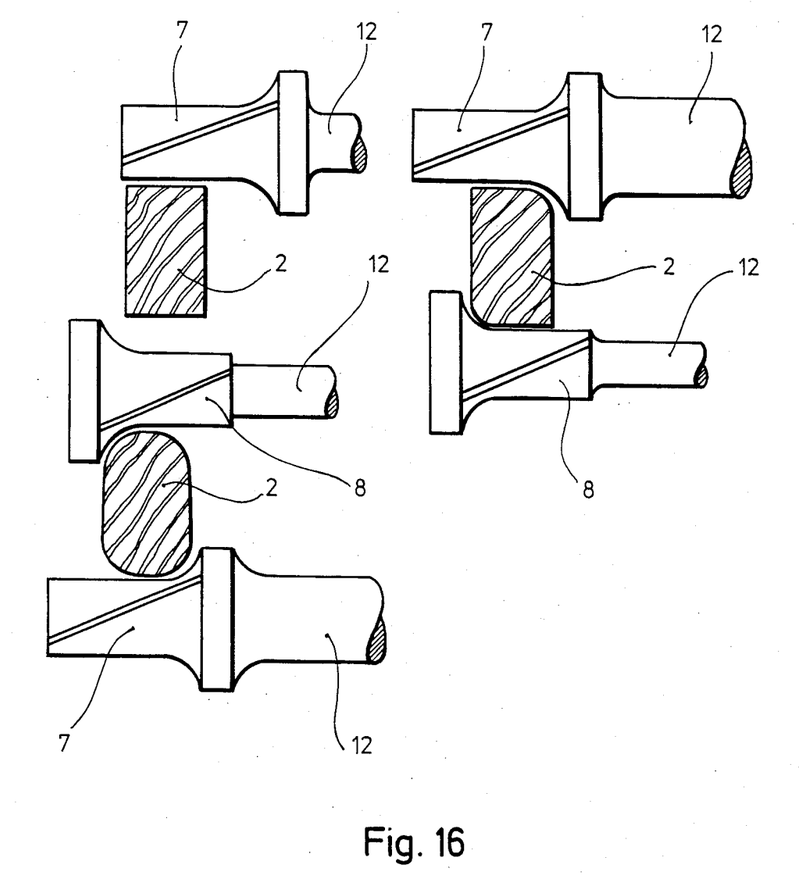
FIG. 16 shows a diagrammatic representation of universal tools and the possible uses thereof.

The cutter 7 can also be used as a universal tool for the simultaneous or successive machining of plane surfaces and chamfers. FIG. 16 shows in the two upper illustrations and in the lowermost illustration a modification of the cutter 7. In this modification, the cutting edges of section 11 are arcuately extended up to the periphery of milling section 13. The cylindrical portion of section 11 may thus be employed for maching plane surfaces, while the arcuate extensions of the cutting edges may be used to form champered edges on workpiece 2, as shown at the upper right and lower left in FIG. 16.

Tool 8 is likewise a universal cutter. It is complementary to and represents as it were the counterpart of the cutter 7, as is clearly evident from FIG. 16. That is the shape of tool 8 is essentially the same as that of tool 7, although inverted with respect to spindle 12, comprising a cylindrical section for machining plane surfaces and arcuately extended cutting edges for forming a chamber.

This tool may be employed in the same manner as tool 7 so that the workpiece is engaged solely by the cylindrical section or solely by the arcuate section. Both sections can also be used simultaneously for machining. This is evident from the various illustrations of FIG. 16.

Tool 9 is a disk-shaped cutter of a conventional type.

Revolving head 5 is mounted on a first tool carriage 19 which is horizontally movable in the direction of the Z axis by a servo drive 20.

The tool carriage 19 is mounted on a second tool carriage 21, which is in turn mounted on a frame 23 for vertical movement in the direction of the Y axis by a servo drive 22. The first and second carriages advance the tool selected for the machining operation in the direction of the Z and Y axes, respectively. For machining the selected tool is rotated to the position opposite the workpiece 2, which for example is the position of the tool 8 in FIGS. 1 and 2. The tool selected is aligned parallel to the Z axis. The rotation of the revolving head 5 is produced by counter- or opposite-rotating servo drives, for example pneumatic drives, which are connected to one another via a returning control chain. The frame 23 is stationary.

Figure 2:
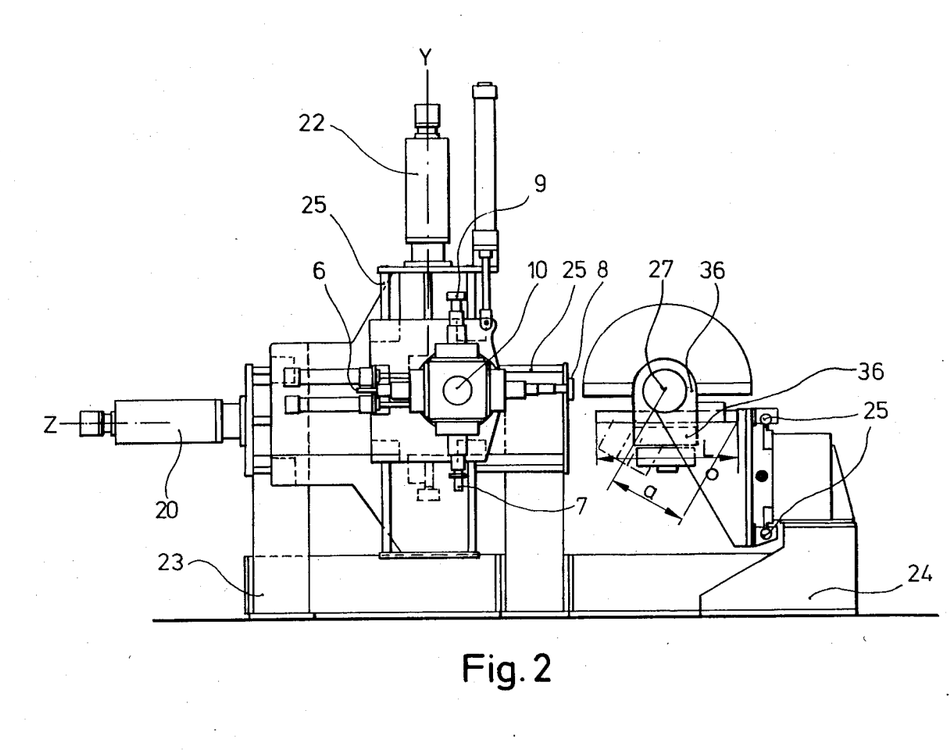
FIG. 2 shows a side view of the apparatus in FIG. 1.
Figure 3:
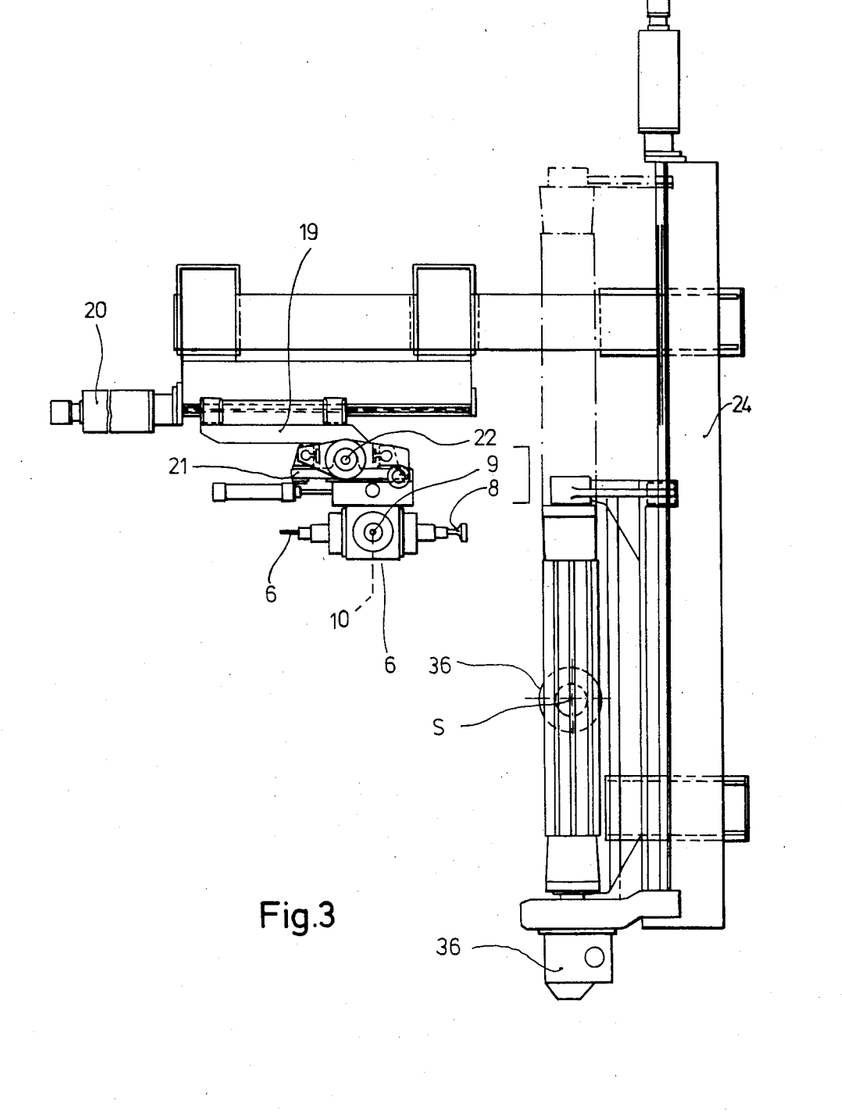
FIG. 3 shows a plan view of the apparatus in FIG. 2.

As already described, the workpiece carriage 4 is mounted so that it is movable in the direction of the X axis, specifically on a frame 24 which is independent of the tool frame 23 and which is likewise stationary mounted on a supporting surface approximately at right angles to the longitudinal axis of frame 23. Both the workpiece carriage 4 and the tool carriages 19 and 21 are each mounted on rod guides 25, as best shown in FIGS. 2 and 3. FIG. 1 shows the guides sealed off by bellows.

The workpiece carriage 4 has a clamping table 26 which is tiltable about a tilt axis 27 extending parallel to the X axis. In the present case, the tilt axis is therefore aligned horizontally.

The clamping table is of swing-type construction and has at both ends side walls 28 and 29 both of which extend in the same direction vertically relative to the table plane on which the bearings for the tilt axis 27 are arranged. The clamping table is of U-shaped configuration with the two side walls forming the free ending U-legs while the table plane constitutes the connecting central leg.

The workpiece carriage 4 has a vertical base plate 30 to facilitate chip removal and the discharge of the workpieces by gravity after completion of machining.

At both ends of the base plate 30 there are two carrying arms 31 projecting in the direction of the tool assembly for mounting of the clamping table 26. The carrying arms 31 are directed obliquely upwards approximately at a 45° angle to the vertical base plate 30. The frame 24 is of rather reduced height and has an upper end surface above which the carrier arms 31 project.

The clamping table 26 has a pivot table 32 which is mounted in a trough formed by its U-shape and mounted for rotation about a pivot axis S perpendicular to the table plane. The pivot axis is located at the longitudinal and transverse center of the table plane of the clamping table, i.e. the axis is arranged in a point-symmetrical position with respect to the table plane. The pivot axis extends perpendicular to the X axis. To allow for the full 360° pivot movement of the clamping table, the distance between the tilt bearings carried by the carrier arms 31 of base plate 30 and side walls 28 and 29 of clamping table 26 correspond to at least half the length of the pivot table 32 to provide for a sufficient free space for the pivotal movement of the pivot table.

Figure 14:
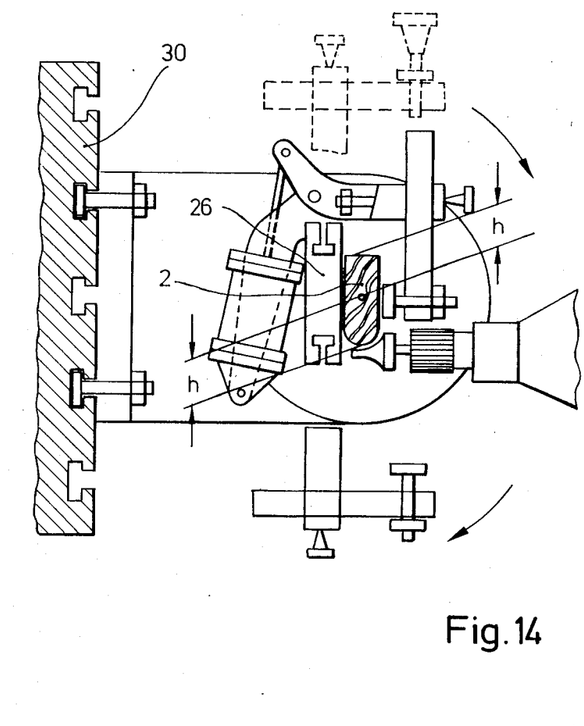
FIG. 14 shows a sectional view of the clamping-element equipped table taken along the line XIV—XIV in FIG. 13.

The clamping table 26 is provided in the customary manner with T-shaped clamping grooves for the anchorage of clamping elements 33. These clamping elements can also be fixed at the rear or on the table edges, as shown for example in FIGS. 14 and 15. These figures also show an opposed positioning of the clamping elements 33 provided for achieving an all-sided machining of the workpiece 2. The operation of the clamping elements is shown in FIG. 14. As the tool 7 is machining the lower longitudinal edge of the workpiece 2, at the same time the clamping elements 33 located on the upper longitudinal edge of the clamping table 26 are in their hold or clamping position, while the lower clamping elements 33 are moved out of the reach of the tool, so as not to hinder the tool during machining. If the tool is to be used for machining the other longitudinal edge positioned at the top in FIG. 14, the lower clamping elements 33 are advanced toward the workpiece 2 to clamp the latter therebetween in addition to the clamping action of the upper clamping elements, which are subsequently released and retracted to make the upper longitudinal workpiece edge accessible for machining. In this context it is to be noted that there occurs merely an exchange of the clamping elements without any change in the clamped position of the workpiece.

In the embodiment shown, the clamping elements are actuated by pneumatic cylinders.

Figure 13:
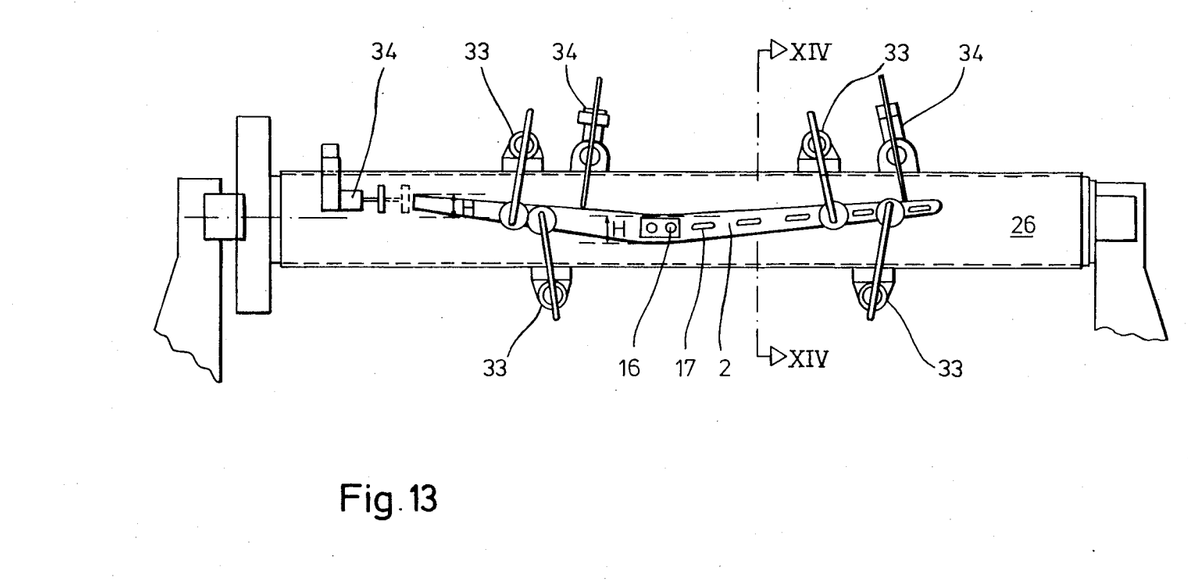
FIG. 13 shows a side view of the clamping table equipped with clamping elements and positioning stops.

In addition to the described clamping elements the mounting table may be provided with centering stops 34, such as longitudinal and lateral stops for accurately positioning the workpiece, as shown in FIG. 13.

In order to keep the working displacements or operating strokes of the tools as short as possible, the workpiece 2 can be clamped on the clamping table so that it is centered relative to a given axis. As shown in FIGS. 13 and 14, the cross-sectional center of the workpiece is exactly aligned with tilt axis 27, as demonstrated by the dimensions h and h.

Figures 11, 12:
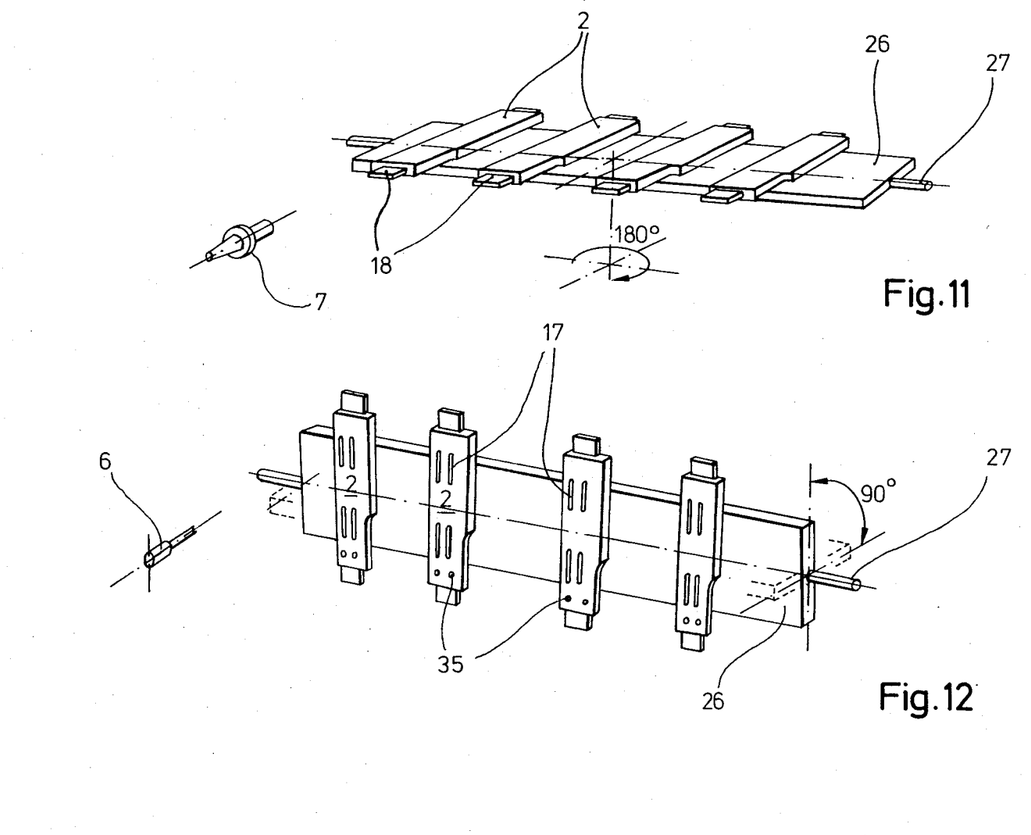
FIG. 11-12 show a diagrammatic, perspective view of the clamping table with a plurality of seat frame members mounted therein for the formation of spigots, slat openings and dowel-holes.

The workpieces 2 do not have to be arranged with their longitudinal axis in the longitudinal direction of the clamping table 26; they can also be positioned transverse to it. FIGS. 11 and 12 show a plurality of workpieces 2, namely armchair battens, arranged side-by-side at right angles to tilt axis 27.

In the case of the armchair battens, initially the cutter 7 is used, in accordance with the illustration in FIG. 11, to produce the tenons 18 on the first ends of the workpieces, as earlier described with respect to FIG. 7.

After machining the first ends of the workpieces, the pivot table is pivoted through 180° so that the second ends of the workpieces can also be provided with tenons.

Subsequently, the clamping table 26 is tilted up through 90° to the position shown in FIG. 12 so that drill 6 can make the slots 17 and the dowel holes 35 in the sides of the workpieces 2.

Figure 9:
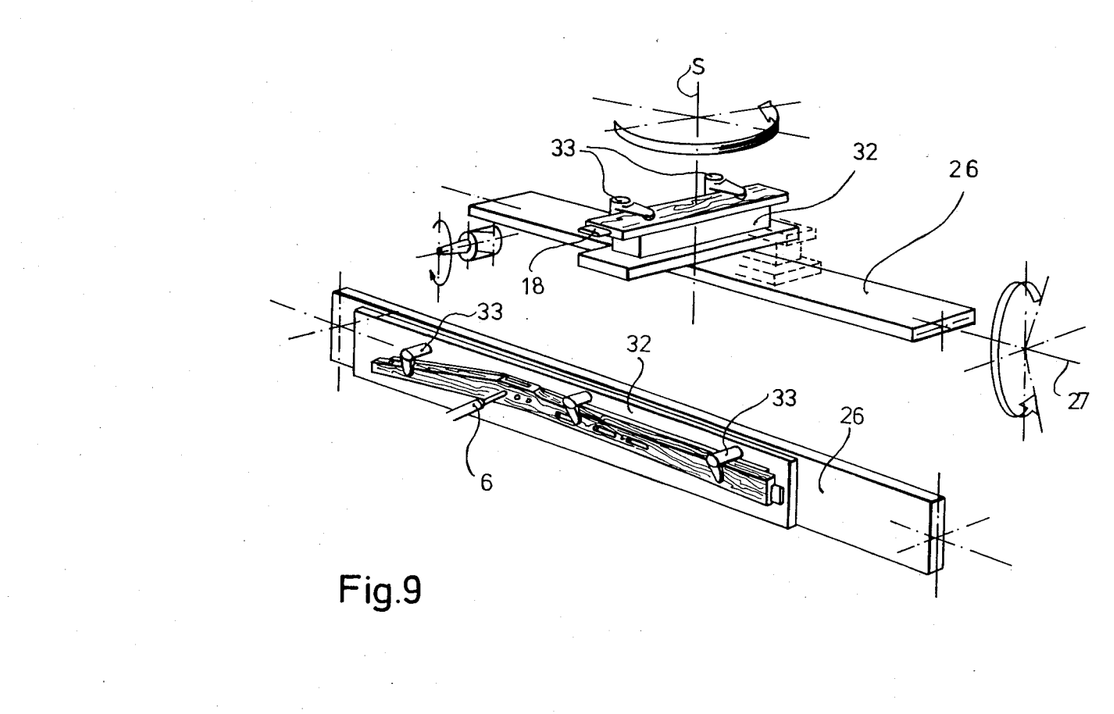
FIG. 9 shows a diagrammatic perspective view of the clamping table and the swivel or pivot table, indicating the possible movements of both tables.

FIG. 9 shows machining with the swivel table locked transverse to the clamping table. For machining the tenons 18, the workpiece 2 is aligned, together with the pivot table, transverse to the tilt axis 27. For machining the sides of the workpiece 2, the pivot table 32 is then arranged parallel to the tilt axis 27 again and tilted together with the clamping table through 90° in the direction of the tool, as is shown in the bottom representation of FIG. 9.

The clamping table 26 and the pivot table 32 are movable by servo drives 36, which in the present embodiment consist of a worm gear, on the output shaft of which a sprocket wheel is additionally fixed which is in engagement with a tension chain pretensioned by a hydraulic cylinder. The servo drives 36 can be seen in FIGS. 2, 3 and 4, while they have been omitted in FIG. 1 for the sake of clarity.

Figure 4:
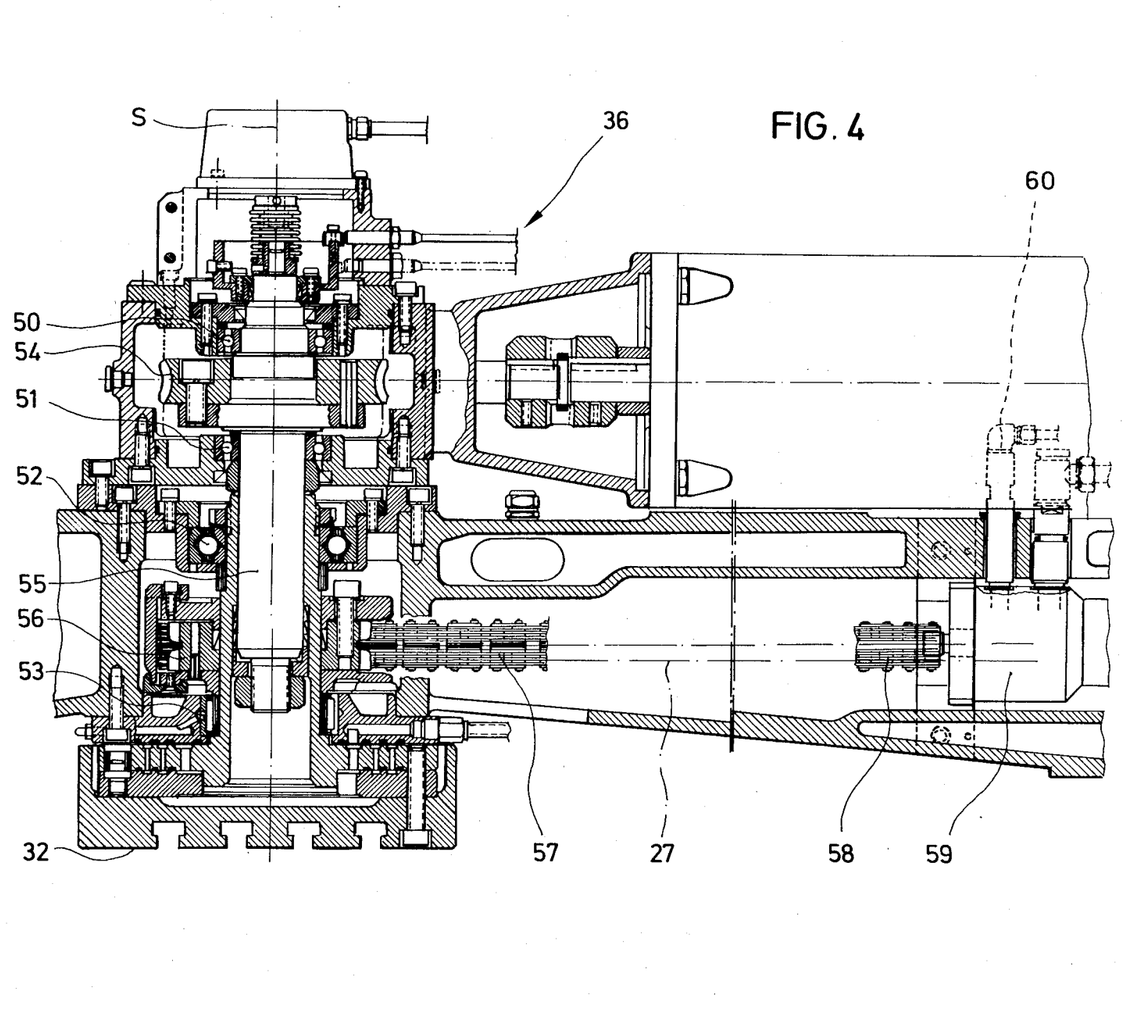
FIG. 4 shows a sectional view through the servo drive of the pivot table associated with the clamping table.

FIG. 4 shows a longitudinal section through the servo drive of the pivot table 32 associated with the clamping table. It can be seen that the pivot axis S is arranged at right angles to the diagrammatically represented tilt axis 27. The pivot table 32 is mounted on the clamping table 26 so that it is rotatable with several ball bearings 50 to 52 and a cylindrical roller bearing 53. Provided between the ball bearings 50 and 51 is a worm wheel 54 constituting an output gear wheel into which a worm gear arranged behind said worm wheel, and therefore not visible in the drawings, engages. The wheel 54 has front and rear tooth flanks. The worm gear constitutes a drive gear. The worm wheel 54 is mounted rotationally rigid on an output shaft 55 of the servo drive 36. The drive shaft 55 itself is in turn rigidly connected to the pivot table 32.

Provided between the ball bearing 52 and the cylindrical roller bearing 53 is a sprocket wheel 56 connected rotatably rigid to the output shaft 55. In engagement with the sprocket wheel and fixed to it is a tension chain 57, the free end 58 of which is connected to the piston rod of a hydraulic cylinder 59.

The hydraulic cylinder 59 constantly exerts a tensile force on the tension chain 57, which is converted via the sprocket wheel 56 into a torque acting on the output shaft. This torque has the effect that, irrespective of the rotational direction of the servo drive 36, the same tooth flanks of the worm wheel 54 are always in contact with the corresponding groove walls of the worm. This is maintained whether the output shaft 55 moves in the direction of the torque exerted by the hydraulic cylinder or moves in the direction opposite this applied torque. When the output shaft is rotated in the direction of the applied torque, the worm gear rotates to conform with this movement which is produced by the applied torque. When the output shaft is moved in the opposite direction, the rotation of the worm gear effects a rotation of the output shaft 55 and the hydraulic cylinder conforms while maintaining a predeterminal force and tension with respect to chain 57. The hydraulic cylinder is connected to a control (not shown) via a terminal 60.

As well as the hydraulic circuit, the control also comprises sensors which measure the clamping or torque force of the tension chain 57. This determined force is used in a set/actual value comparison to control the movement of the piston rod of the hydraulic cylinder in such a way that the tension of the tension chain 57 remains constant in every angular position of the swivel table and during any rotational movement of the swivel table 32.

The servo drive 36 for the tilting movement of the clamping table 26 is analogous to the servo drive 36 of the swivel table 32 described above.

Figure 5:
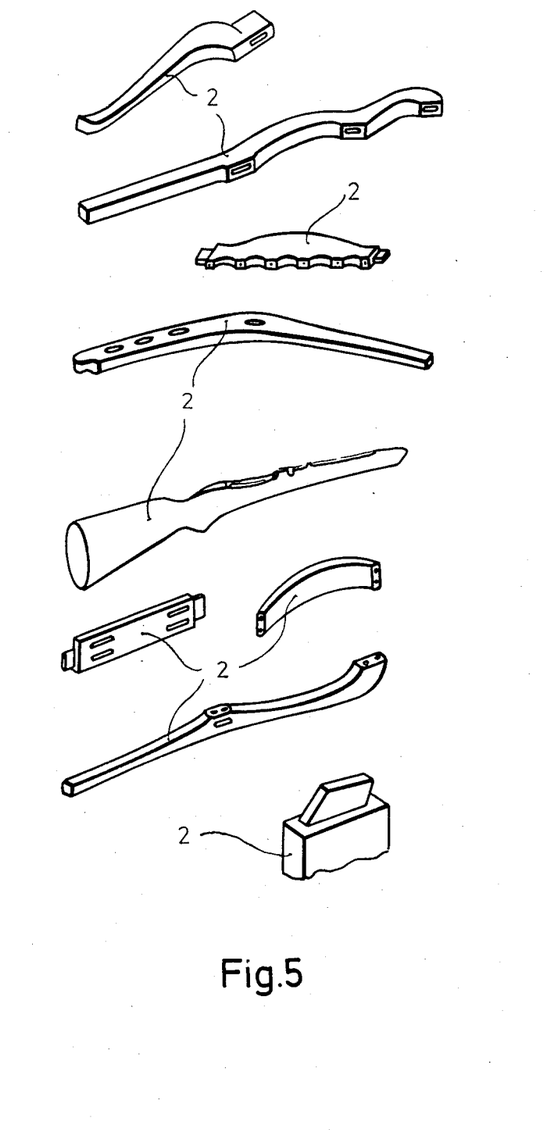
FIG. 5 shows a perspective view of various workpieces.

The device according to the invention is used in particular for the transverse working of workpieces made of solid wood, as are illustrated for example in FIG. 5. The workpieces can be worked on the longitudinal sides and faces, at the edges and on the surfaces; deep working is also possible, for example, to produce tenons and bore holes or the inlets of rifle butts. The tenons and bore holes can also be positioned obliquely to the longitudinal direction of the workpieces, as is shown for example by the bottom workpiece 2 in FIG. 5.

For machining, the blanks or prepared workpieces can be fed to the swivel table manually or automatically, after which they are clamped with the aid of clamping elements 33 following exact positioning and possibly centering according to weight or shape.

The corresponding program for the desired transverse machining is fed into the control facility. The specific tools necessary for this program are arranged on the revolving tool carrier head, after which the control facility controls all further adjusting, clamping and machining operations independently. In the present embodiment, the individual workpieces or tool carriages are driven by d.c. motors via ball roller spindles. As earlier described each drive to be controlled has a shaft encoder for recording the actual position and a tachometer for the set/actual value comparison of the rotational speed.

Each workpiece is positioned on the pivot table and on the clamping table in such a way that the transverse or longitudinal working processes can be performed in an optimum manner for machining efficiency. If the clamping elements, for example for edge working, interfer, they can be exchanged in overlapping relationship against oppositely located clamping elements operative to clamp the workpiece from the opposite side so that the clamping position remains unchanged. If desired, however, the clamping position may of course be changed, for instance by use of an automatic workpiece clamping unit.

Figure 15:
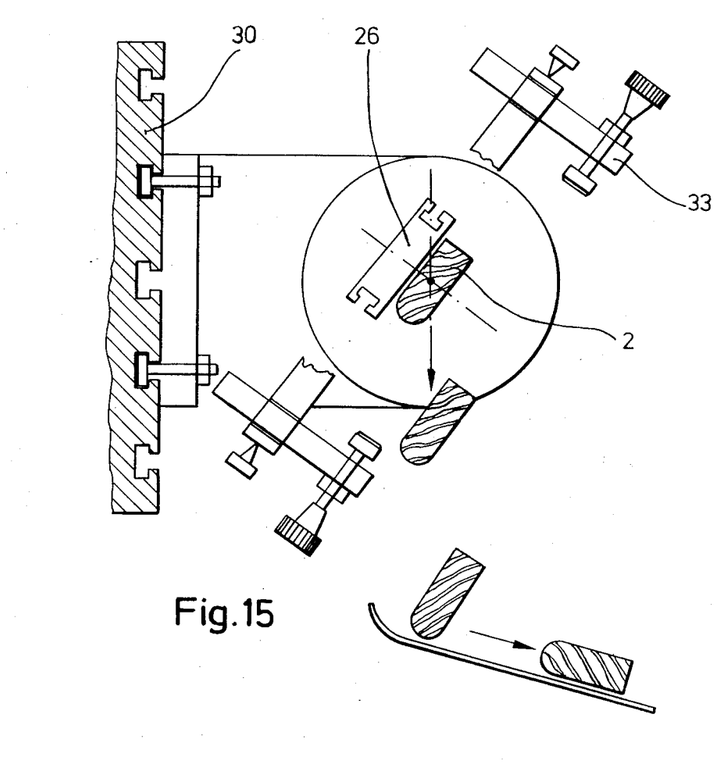
FIG. 15 shows the diagrammatic representation of the clamping table equipped with opposing clamping elements shown in the discharge position.

Once a control program has been established for a particular workpiece, it can be stored in a program card index or the like for use in subsequent repeat machining operations. This results in set-up times of only a few minutes. Tool changes can be carried out just as quickly. The workpiece needs only to be clamped once for machining, including finish machining. With the device of the invention, the workpieces can be machined to a final stage ready for lacquering. FIG. 15 shows how the workpieces can be automatically discharged by opposing clamping elements. For this purpose, the pivot table is inclined through 45° from the vertical so that the workpiece is under the swivel table. This causes the lower clamping elements to swivel back sufficiently that the workpiece can drop downwards vertically. If there are no lower clamping elements 33, it is sufficient, as shown in FIG. 14, to simply release the upper clamping elements. The workpiece drops vertically downward without any interference.

For certain workpieces, it may be advantageous to use spacer elements in arranging them on the pivot table. In this manner, edge portions of the workpieces adjacent to the pivot table surface can also be machined.

The revolver head 5 with the tools 6, 7, 8 and 9 can be moved by the tool carriages 19 and 21 in the Y and Z directions respectively, for the correct machining position. It is also possible to mount the revolving head rigidly or in a stationary position to provide the workpiece carriage with two additional degrees of freedom in Y and Z directions using carriages similar to tool carriages 19 and 21.

For the sake of completeness, it should also be mentioned that in the case of machining operations in the X direction the workpiece carriage 4 travels with the workpiece along the tool in the X direction. For spot machining, the workpiece carriage is held in position until the machining is complete.

Although the device is intended for the machining of wood workpieces, it can also be used for the working of metal materials having a machining behavior similar to wood. For example, the machining of aluminum alloys and plastics would be feasible.

I claim:

1. A device for the transverse and/or longitudinal working of wood workpieces comprising a clamping table which is rotatable or pivotable about at least one axis and which is connected to an output shaft of a servo drive positioned along said axis, an output gear wheel having front and rear tooth flanks and connected via a drive gear to said servo drive and a sprocket wheel rigidly mounted on said output shaft, the sprocket wheel being in engagement with a tension chain exerting a torque on the output shaft in a predetermined rotational direction, one free end of the tension chain being connected to a controllable fluid cylinder so that in any rotational direction of the servo drive and the output shaft, either front or rear tooth flanks of the output gear wheel are constantly in contact with corresponding flanks of said drive gear.

2. The device of claim 1 wherein another free end of the tension chain is fixed to the sprocket wheel.

3. The device of claims 1 or 2 wherein the drive gear is a worm and the output gear wheel is a worm wheel.

4. The device as in one of claims 1 or 2, wherein the fluid cylinder is an hydraulic cylinder.

5. The device as in one of claims 1 or 2, wherein the fluid cylinder has associated sensors allowing a control of an even tensioning of the tension chain.

6. The device for the transverse and/or longitudinal working of wood workpieces comprising a clamping table which is rotatable or pivotable about at least one axis and which is connected to an output shaft of a servo drive positioned along said axis, an output worm gear wheel having front and rear tooth flanks and connected via a worm drive gear to said servo drive and a sprocket wheel rigidly mounted on said output shaft, the sprocket wheel being in engagement with a tension chain exerting a torgue on the output shaft in a predetermined rotational direction, one free end of the tension chain being connected to a controllable hydraulic cylinder and another free end being fixed to the sprocket wheel so that in any rotational direction of the servo drive and the output shaft, either front or rear tooth flanks of the output worm gear wheel are constantly in contact with corresponding flanks of said worm drive gear.

7. The device of claim 6 wherein the hydraulic cylinder has associated sensors allowing a control of an even tensioning of the tension chain.

* * * * *